(12) United States Patent
Sekine et al.

(10) Patent No.: US 11,221,457 B2
(45) Date of Patent: Jan. 11, 2022

(54) INTERMITTENT CONNECTION-TYPE OPTICAL FIBER RIBBON, AND METHOD FOR MANUFACTURING INTERMITTENT CONNECTION-TYPE OPTICAL FIBER RIBBON

(71) Applicant: FUJIKURA LTD., Tokyo (JP)

(72) Inventors: Shizuka Sekine, Chiba (JP); Mizuki Isaji, Chiba (JP); Kouji Tomikawa, Chiba (JP); Ken Osato, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/753,164

(22) PCT Filed: Jul. 23, 2018

(86) PCT No.: PCT/JP2018/027426
§ 371 (c)(1),
(2) Date: Apr. 2, 2020

(87) PCT Pub. No.: WO2019/069537
PCT Pub. Date: Apr. 11, 2019

(65) Prior Publication Data
US 2020/0292771 A1 Sep. 17, 2020

(30) Foreign Application Priority Data
Oct. 5, 2017 (JP) .............................. JP2017-195298

(51) Int. Cl.
*G02B 6/44* (2006.01)
(52) U.S. Cl.
CPC .................... *G02B 6/448* (2013.01)

(58) Field of Classification Search
CPC ...................................................... G02B 6/448
(Continued)

(56) References Cited

U.S. PATENT DOCUMENTS

| 2003/0118301 A1 | 6/2003 | Hurley et al. |
| 2006/0045443 A1* | 3/2006 | Blazer ................... G02B 6/448 |
| | | 385/114 |
| 2017/0090135 A1 | 3/2017 | Sato et al. |

FOREIGN PATENT DOCUMENTS

| CN | 101027588 A | 8/2007 |
| CN | 202916467 U | 5/2013 |

(Continued)

OTHER PUBLICATIONS

Office Action issued in corresponding Chinese Patent Application No. 201880047840.X, dated Jun. 30, 2020 (10 pages).

*Primary Examiner* — Jerry M Blevins
(74) *Attorney, Agent, or Firm* — Osha Bergman Watanabe & Burton LLP

(57) ABSTRACT

An intermittent connection-type optical fiber ribbon including: optical fibers aligned in a width direction of the intermittent connection-type optical fiber ribbon; and a connection part disposed between two separation spaces that are aligned in a lengthwise direction of the intermittent connection-type optical fiber ribbon and that separate adjacent ones of the optical fibers. A percentage content of the air bubbles is equal to or less than 15.5%. The percentage content of the air bubbles is a proportion of a total area of the air bubbles contained in the connection part to an area of the connection part in a section acquired by cutting the intermittent connection-type optical fiber in the width direction.

11 Claims, 15 Drawing Sheets

(58) Field of Classification Search
USPC .......................................................... 385/114
See application file for complete search history.

(56) References Cited

FOREIGN PATENT DOCUMENTS

| | | | |
|---|---|---|---|
| CN | 106908924 | A | 6/2017 |
| JP | 2000-353430 | A | 12/2000 |
| JP | 2001-264605 | A | 9/2001 |
| JP | 2003-107306 | A | 4/2003 |
| JP | 2006-292802 | A | 10/2006 |
| JP | 2008-511869 | A | 4/2008 |
| JP | 4143651 | B2 | 9/2008 |
| JP | 2010-033010 | A | 2/2010 |
| JP | 4619424 | B2 | 1/2011 |
| JP | 2013-257394 | A | 12/2013 |
| JP | 2016-80849 | A | 5/2016 |
| JP | 2017-062431 | A | 3/2017 |
| WO | 2016163190 | A1 | 10/2016 |

* cited by examiner

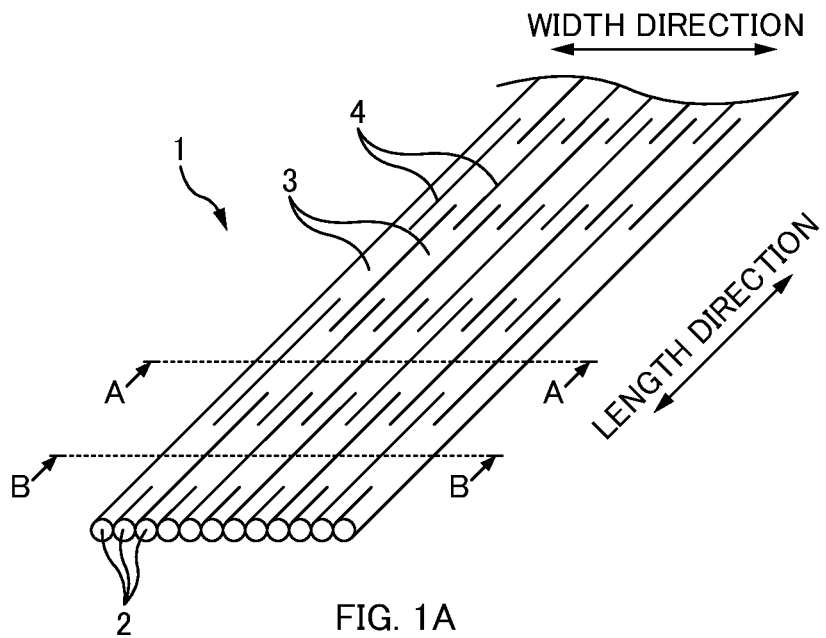
FIG. 1A
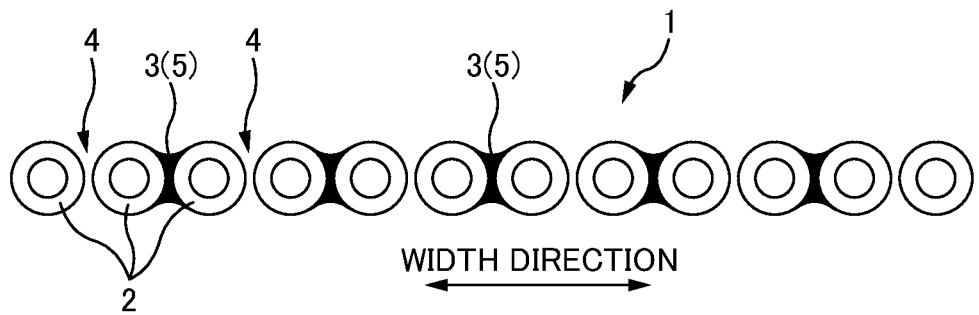
FIG. 1B (CROSS-SECTIONAL VIEW TAKEN ALONG A-A)
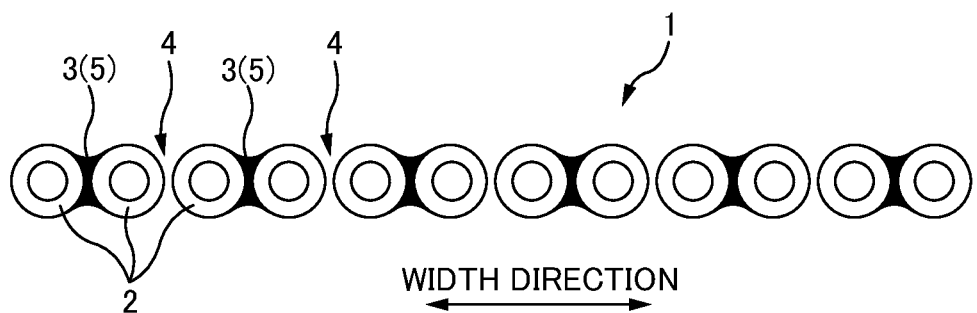
FIG. 1C (CROSS-SECTIONAL VIEW TAKEN ALONG B-B)

INTERMITTENT CONNECTION-TYPE OPTICAL FIBER RIBBON, AND METHOD FOR MANUFACTURING INTERMITTENT CONNECTION-TYPE OPTICAL FIBER RIBBON

TECHNICAL FIELD

The present invention relates to an intermittent connection-type optical fiber ribbon, and a method for manufacturing an intermittent connection-type optical fiber ribbon.

BACKGROUND ART

Patent Literatures 1 and 2 describe an optical fiber ribbon (intermittent connection-type optical fiber ribbon) in which three or more optical fibers aligned in parallel are intermittently connected. Further, Patent Literature 3 describes that an optical fiber ribbon is manufactured by curing a taping agent intermittently applied in a length direction. Note that paragraph 0007 in Patent Literature 3 describes that generation of an air bubble in a resin serving as a taping agent is desired to be avoided.

Further, Patent Literatures 4 to 6 include description related to a method for manufacturing an intermittent connection-type optical fiber ribbon.

PATENT LITERATURE

Patent Literature 1: Japanese Patent No. 4143651
Patent Literature 2: Japanese Patent No. 4619424
Patent Literature 3: JP 2001-264605A
Patent Literature 4: JP 2016-80849A
Patent Literature 5: JP 2013-257394A
Patent Literature 6: JP 2010-33010A When a plurality of optical fibers aligned in a width direction are integrally connected, as in the optical fiber ribbon described in Patent Literature 3, an optical fiber ribbon cannot be folded in the width direction, and it becomes more difficult to mount the optical fibers at a high density. In contrast, when a separation part (corresponding to a "non-resin part" in FIG. 3 in Patent Literature 2) is formed between a plurality of optical fibers aligned in a width direction, as in the optical fiber ribbon described in Patent Literatures 1 and 2, an optical fiber ribbon can be folded in the width direction as illustrated in FIG. 3 in Patent Literature 2. Thus, according to an intermittent connection-type optical fiber ribbon in which a separation part is disposed in a width direction of a connection part, optical fibers can be mounted at a high density, and a small-diameter optical cable can be achieved.

In the intermittent connection-type optical fiber ribbon, unintentional breakage of the connection part needs to be suppressed. However, in a case where the connection part is formed too hard in order to increase strength of the connection part, there is a possibility that, when the optical fiber ribbon is folded in the width direction (is bent in the width direction), a crack may be formed in the connection part or the connection part may be peeled from the optical fiber, and the connection part may thus be broken.

SUMMARY

One or more embodiments of the present invention suppress breakage of a connection part when an optical fiber ribbon is bent in a width direction.

One or more embodiments of the present invention are an intermittent connection-type optical fiber ribbon comprising:
a plurality of optical fibers aligned in a width direction,
separation parts that separate the optical fibers adjacent to each other being intermittently formed in a length direction, to form a connection part between the separation part and another separation part of the separation parts aligned in the length direction, wherein
air bubbles are contained in the connection part.

Other features of the invention are made clear by the following description and the drawings.

ADVANTAGEOUS EFFECTS OF INVENTION

According to one or more embodiments of the present invention, it is possible to suppress breakage of a connection part when an optical fiber ribbon is bent in a width direction.

BRIEF DESCRIPTION OF DRAWINGS

FIGS. 1A to 1C are explanatory diagrams illustrating an optical fiber ribbon 1 according to one or more embodiments.

DETAILED DESCRIPTION

Figure 2:
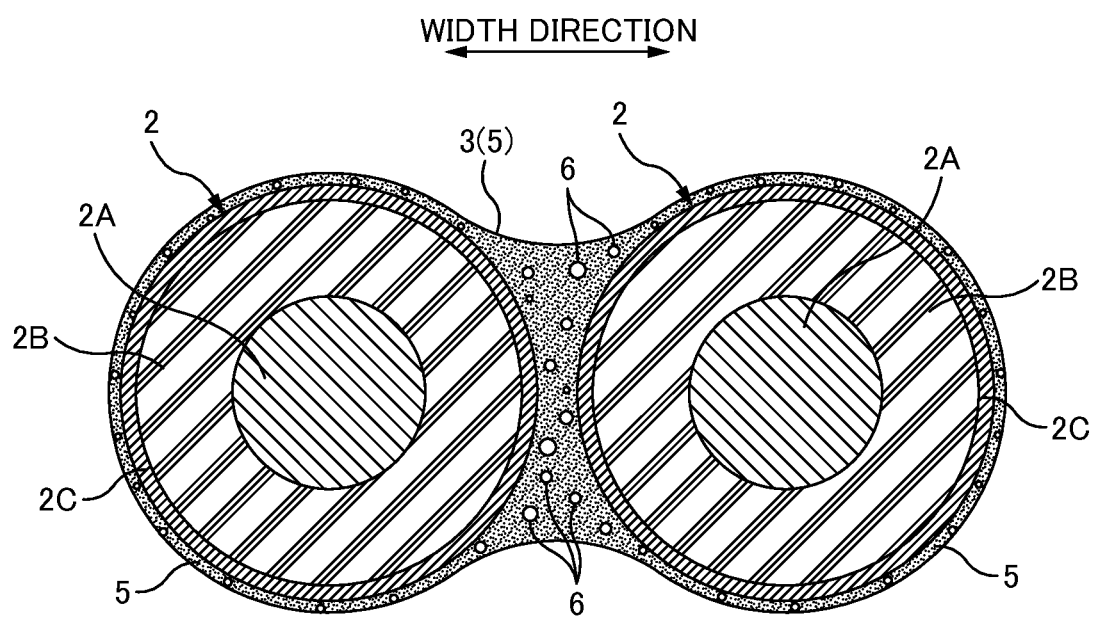
FIG. 2 is a cross-sectional view of adjacent optical fibers 2.

At least the following matters are made clear from the following description and the drawings.

An intermittent connection-type optical fiber ribbon will become clear, comprising:
a plurality of optical fibers aligned in a width direction,
separation parts that separate the optical fibers adjacent to each other being intermittently formed in a length direction, to form a connection part between the separation part and another separation part of the separation parts aligned in the length direction, wherein air bubbles are contained in the connection part.

With this intermittent connection-type optical fiber ribbon, it is possible to suppress breakage of the connection part when the optical fiber ribbon is bent in the width direction while suppressing an increase in transmission loss during mid-span post branching.

Any of the separation parts and the connection part may be disposed in the width direction.

In this way, the optical fiber ribbon can be bent in the width direction.

All of the optical fibers aligned in the width direction may be connected to the adjacent optical fiber with the connection parts intermittently disposed in the length direction.

In this way, the optical fiber ribbon can be more easily bent in the width direction.

An optical fiber group acquired by connecting, with another connection part continuously located in the length direction, a part of the optical fibers aligned in the width direction to the adjacent optical fiber is formed, and the adjacent optical fiber groups are connected to each other with the connection parts intermittently disposed in the length direction.

In this way, the optical fiber ribbon can be bent in the width direction, and, at the same time, fusion splicing can be improved.

A diameter of air bubbles in the number of equal to or greater than 80% (i.e., 80% or greater) of a total number of the air bubbles contained in the connection part may be equal to or less than 70 µm (i.e., 70 µm or less).

In this way, a decrease in transmission loss due to application of lateral pressure to the optical fiber can be suppressed while breakage of the connection part can be suppressed.

A percentage content of air bubbles being a proportion of a total area of the air bubbles contained in the connection part to an area of the connection part in a section acquired by cutting the intermittent connection-type optical fiber ribbon in the width direction may be equal to or greater than 0.2% and equal to or less than 15% (i.e., between 0.2% and 15%).

In this way, a contact area of an outer surface of the optical fiber and the connection parts can be secured, and adhesion of the connection parts to the optical fibers is increased. Thus, the connection parts are less likely to be peeled from the optical fibers, and breakage of the connection parts can be suppressed.

The air bubbles contained in the connection part may not contact an outer surface of the optical fiber.

In this way, a contact area of an outer surface of the optical fiber and the connection parts can be secured, and adhesion of the connection parts to the optical fibers is increased. Thus, the connection parts are less likely to be peeled from the optical fibers, and breakage of the connection parts can be suppressed.

A method for manufacturing an intermittent connection-type optical fiber ribbon including a plurality of optical fibers aligned in a width direction will become clear, separation parts that separate the optical fibers adjacent to each other being intermittently formed in a length direction, to form a connection part between the separation part and another separation part of the separation parts aligned in the length direction, the method comprising:

applying a connection material between the optical fibers adjacent to each other; and forming the connection part by curing the connection material, wherein air bubbles are contained in the connection part.

With this manufacturing method, it is possible to suppress breakage of the connection parts when the optical fiber ribbon is bent in the width direction while suppressing an increase in transmission loss during mid-span post branching in the optical fiber ribbon.

The method for manufacturing an intermittent connection-type optical fiber ribbon, further comprising containing the air bubbles in the connection material before applying the connection material.

In this way, the connection parts containing the air bubbles can be manufactured.

The method for manufacturing an intermittent connection-type optical fiber ribbon, further comprising: mixing the air bubbles into the connection material, and applying the connection material between the optical fibers adjacent to each other in applying the connection material.

In this way, the connection parts containing the air bubbles can be manufactured.

The method for manufacturing an intermittent connection-type optical fiber ribbon, further comprising: foaming the connection material after applying the connection material and before forming the connection part by curing the connection material.

In this way, the connection parts containing the air bubbles can be manufactured.

The method for manufacturing an intermittent connection-type optical fiber ribbon, further comprising: applying a connection material that does not contain an air bubble to an outer surface of the optical fiber facing between the optical fibers adjacent to each other before applying the connection material.

In this way, the optical fiber ribbon in which the air bubbles contained in the connection parts do not contact the outer surface of the optical fiber can be manufactured.

<Intermittent Connection-type Optical Fiber Ribbon 1>

Figure 3A:
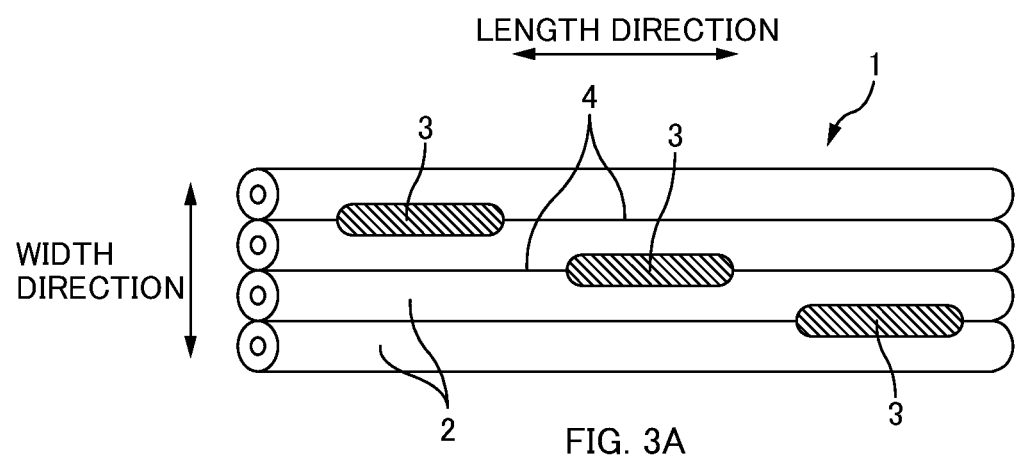
FIGS. 3A and 3B are explanatory diagrams illustrating bending in a width direction of the optical fiber ribbon 1.
Figure 3B:
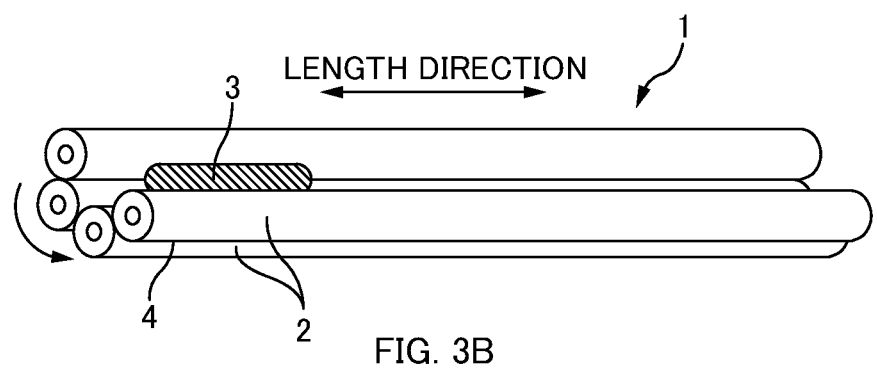

FIGS. 1A to 1C are explanatory diagrams illustrating an optical fiber ribbon 1 according to one or more embodiments. FIG. 1B is an A-A cross-sectional view taken along A-A in FIG. 1A. FIG. 1C is a cross-sectional view taken along B-B in FIG. 1A. FIG. 2 is a cross-sectional view of adjacent optical fibers 2. FIGS. 3A and 3B are explanatory diagrams illustrating bending in a width direction of the optical fiber ribbon 1. The number of the optical fibers 2 is reduced to simplify the drawings.

As illustrated in FIGS. 1A to 1C, the optical fiber ribbon 1 includes a plurality of optical fibers 2 aligned in the width direction. In one or more embodiments, the number of the optical fibers 2 is 12, but can be changed as appropriate. In the optical fiber ribbon 1, a direction parallel to the optical fiber 2 is a length direction. A separation part 4 that separates the adjacent optical fibers 2 is intermittently formed in the length direction. Thus, a connection part 3 that connects the adjacent optical fibers 2 is formed between the separation part 4 and the separation part 4 aligned in the length direction.

The connection part 3 is intermittently formed in the length direction, and is also intermittently formed in the width direction. Thus, the connection part 3 and the non-connection part 4 are disposed in the width direction. In other words, the optical fiber ribbon 1 is an intermittent connection-type optical fiber ribbon. In the optical fiber ribbon 1 according to one or more embodiments, all of the optical fibers 2 aligned in the width direction are connected to the adjacent optical fiber(s) 2 with the connection parts intermittently disposed in the length direction, but arrangement of the connection parts 3 can be changed as appropriate.

As illustrated in FIG. 2, the optical fiber 2 is constituted with an optical fiber part 2A, a sheath layer 2B, and a colored layer 2C. A diameter of the optical fiber 2 is about 250 μm, for example. The optical fiber part 2A is constituted with a core and a clad. The optical fiber part 2A is, for example, a silica glass fiber. A diameter (cladding diameter) of the optical fiber part 2A is about 125 μm, for example. The sheath layer 2B is a layer that coats the optical fiber part 2A. The sheath layer 2B is constituted by, for example, a primary sheath layer (primary coating) and a secondary sheath layer (secondary coating). A diameter of the sheath layer 2B is about 240 μm, for example. The colored layer 2C is a layer formed on a surface of the sheath layer 2B. The colored layer 2C is formed by applying a coloring material to the surface of the sheath layer 2B.

An ultraviolet curing resin can be exemplified as a connection material 5 constituting the connection part 3. The connection part 3 is formed by applying an ultraviolet curing resin to a surface of the colored layer 2C of the optical fiber 2, and then curing the ultraviolet curing resin by irradiation with ultraviolet rays. Note that the connection material 5 may be a thermoplastic resin.

The connection part 3 and the non-connection part 4 are disposed in the width direction. In the non-connection part 4, the two adjacent optical fibers 2 are not restrained to each other. For this reason, the optical fiber ribbon 1 having a tape shape as illustrated in FIG. 3A can be bent in the width direction as illustrated in FIG. 3B. Thus, when an optical cable 10 (cf. FIGS. 6A and 6B) described later is manufactured by using the optical fiber ribbon 1, for example, a small-diameter optical cable 10 can be manufactured by rolling up the optical fiber ribbon 1 in the width direction into a tube shape or a spiral shape or folding the optical fiber ribbon 1 in the width direction.

Herein, unintentional breakage of the connection part 3 needs to be suppressed. However, in a case where the connection part 3 is formed too hard in order to increase strength of the connection part 3, there is a possibility that, when the optical fiber ribbon 1 is bent in the width direction, a crack may be formed in the connection part 3 or the connection part 3 may be peeled from the optical fiber 2, and the connection part 3 may thus be broken.

Thus, as illustrated in FIG. 2, it is assumed that air bubbles 6 are contained in the connection part 3 in the optical fiber ribbon 1 according to one or more embodiments. The air bubbles 6 increase flexibility (ease of bending) and shock absorption (cushioning) of the connection part 3. Thus, when the optical fiber ribbon 1 is bent in the width direction, the connection part 3 flexibly changes shape, and thus breakage of the connection part 3 is suppressed.

When the optical fiber ribbon 1 is also bent in the length direction, the connection part 3 flexibly changes shape with the air bubbles 6. Thus, when local bending (bending in the length direction) is also applied to the optical fiber ribbon 1 in the optical cable 10 during manufacturing, laying, and the like of the optical cable 10, for example, breakage of the connection part 3 is suppressed.

Further, high shock absorption of the connection part 3 reduces force acting on the connection part 3 when the optical fibers 2 are gathered together during manufacturing of the optical cable 10, for example. Thus, breakage of the connection part 3 is suppressed.

The connection part 3 and the non-connection part 4 are aligned in the width direction in the optical fiber ribbon 1 according to one or more embodiments. In other words, the connection parts 3 adjacent to each other in the width direction are disposed so as to be displaced from each other in the length direction. The connection parts 3 adjacent to each other in the width direction may be disposed so as not to overlap each other in the length direction. In this way, the optical fiber ribbon 1 is more easily bent in the width direction, and breakage of the connection part 3 is further suppressed.

By suppressing breakage of the connection part 3, the optical fiber 2 in the optical cable 10 can be identified, and any optical fiber 2 can be taken out from midway of the optical cable 10. In other words, mid-span post branching property of the optical cable 10 is secured.

In one or more embodiments, unintentional breakage of the connection part 3 is prevented by increasing flexibility and shock absorption of the connection part 3 with the air bubbles 6 instead of forming the connection part 3 hard. In a case in which breakage of the connection part 3 is prevented by simply forming the connection part 3 hard without mixing air bubbles in the connection part 3 or increasing adhesion between the colored layer 2C and the connection material 5, there is a possibility that a transmission loss during mid-span post branching may be increased. Specifically, when the connection part 3 is broken for single core separation of the optical fiber 2 during mid-span post branching, a transmission loss is increased due to tensile stress applied to a live wire (optical fiber 2). In contrast, an increase in transmission loss during mid-span post branching can be suppressed in one or more embodiments.

<Method for Manufacturing Optical Fiber Ribbon 1>

Figure 4:
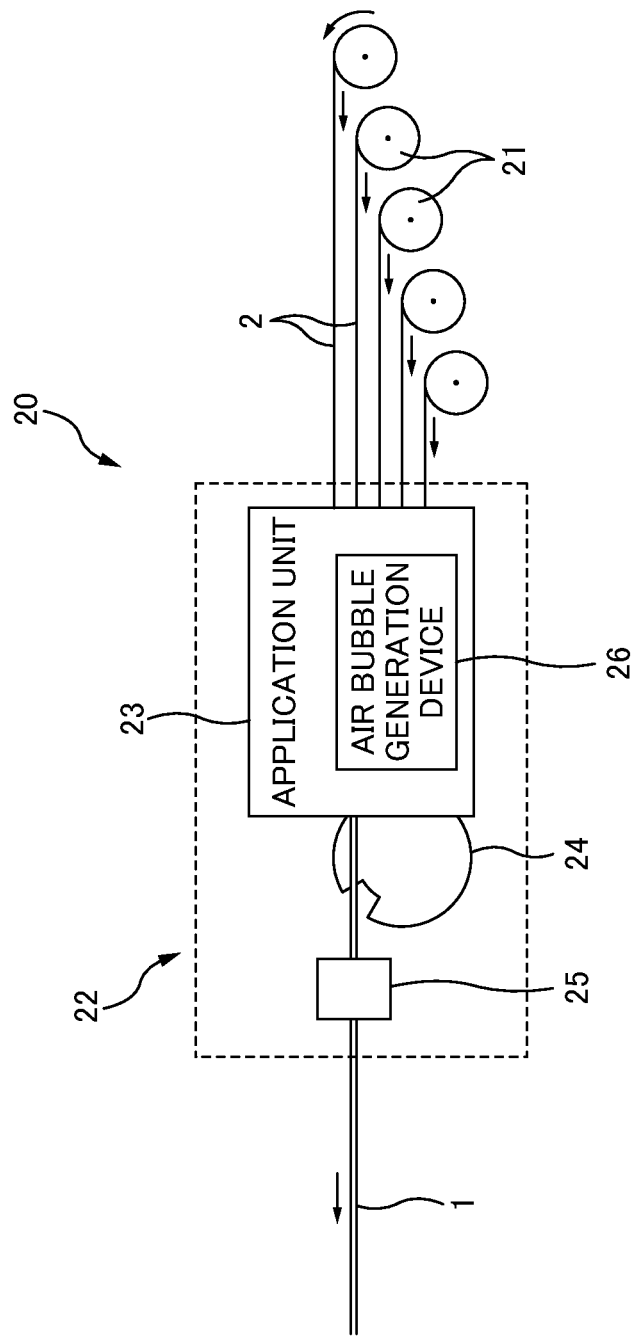
FIG. 4 is an explanatory diagram illustrating a tape manufacturing device 20 that manufactures the optical fiber ribbon 1 according to one or more embodiments.
Figure 5A:
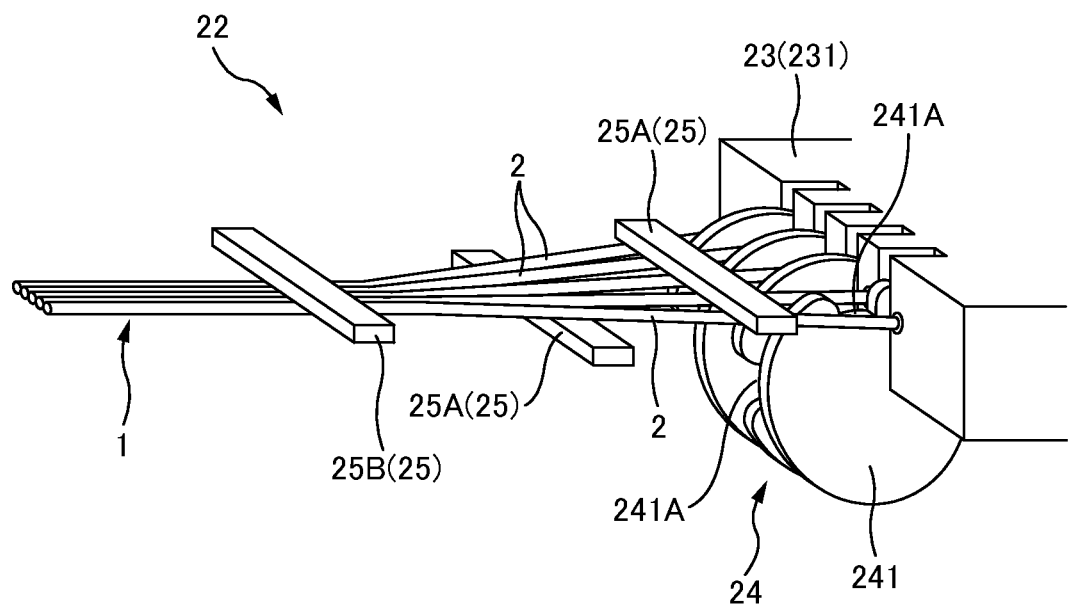
FIGS. 5A and 5B are explanatory diagrams illustrating a taping device 22.
Figure 5B:
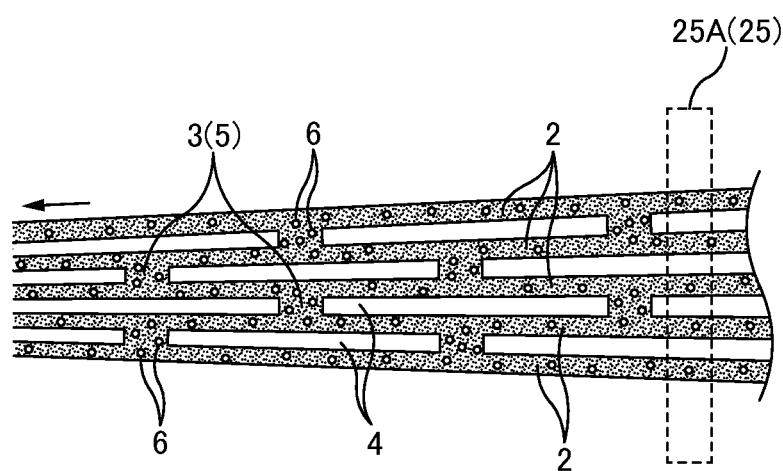

FIG. 4 is an explanatory diagram illustrating a tape manufacturing device 20 that manufactures the optical fiber ribbon 1 according to one or more embodiments. FIGS. 5A and 5B are explanatory diagrams illustrating a taping device 22. The number of the optical fibers 2 is five in order to simplify the drawings.

The tape manufacturing device 20 includes a fiber supply unit 21 and the taping device 22. The fiber supply unit 21 is a device that supplies, to the taping device 22, the plurality of optical fibers 2 in a state of being aligned in a predetermined direction (width direction).

The taping device 22 is a device that intermittently forms the connection part 3 containing the air bubbles 6. The taping device 22 includes an application unit 23, a removal unit 24, and a light source 25.

The application unit 23 is a device that applies the connection material 5 containing the air bubbles 6, herein, an ultraviolet curing resin, and includes an air bubble generation device 26. The plurality of optical fibers 2 are inserted through a coating die 231 (cf. FIG. 5A) filled with the liquid connection material 5 containing the air bubbles 6 generated with the air bubble generation device 26. The plurality of optical fibers 2 in the state of being aligned in the predetermined direction (width direction) are inserted through the coating die 231. Thus, the liquid connection material 5 containing the air bubbles 6 is applied between the adjacent optical fibers 2 in the length direction.

A known air bubble generation device can be adopted as the air bubble generation device 26. For example, a device that generates an air bubble by applying ultrasonic vibration to the connection material 5, a device that mixes the connection material 5 and gas, produces an air bubble from the gas, and disperses the air bubble in the connection material 5, a device that generates an air bubble by applying pressure to gas to dissolve the gas in the connection material 5, and then reducing the pressure, and the like can be exemplified.

The removal unit 24 is a device that removes a part of the connection material 5 applied by the application unit 23 while leaving a part of the connection material 5. As illustrated in FIG. 5A, the removal unit 24 includes a rotary blade 241 including a recessed part 241A, and rotates the rotary blade 241 in accordance with a supply speed of the optical fiber 2. The connection material 5 applied by the application unit 23 is removed by an outer edge of the rotary blade 241, and the connection material 5 remains in the recessed part 241A of the rotary blade 241. A remaining part of the connection material 5 serves as the connection part 3, and a removed part of the connection material 5 serves as the non-connection part 4.

The light source 25 is a device that irradiates the connection material 5 being the ultraviolet curing resin with ultraviolet rays. The light source 25 includes a temporary curing light source 25A and a main curing light source 25B. The temporary curing light source 25A is disposed upstream of the main curing light source 25B. The connection material 5 is temporarily cured in a state of containing the air bubbles 6 when being irradiated with ultraviolet rays from the temporary curing light source 25A. The connection material 5 being temporarily cured is not completely cured, but is in a state where a surface is in process of curing. The main curing light source 25B completely cures the connection material 5 by irradiating the connection material 5 with ultraviolet rays stronger than those of the temporary curing light source 25A. The connection material 5 being completely cured is cured to the inside in a state of containing the air bubble 6, thereby forming the connection part 3.

Note that the connection material 5 (connection part 3) being completely cured has moderate elasticity in order not to break the connection part 3 when the optical fiber ribbon 1 is bent in the width direction. The connection part 3 according to one or more embodiments contains the air bubbles 6 in addition to having moderate elasticity, and thus breakage of the connection part 3 can be further suppressed.

As illustrated in FIG. 5B, the optical fibers 2 immediately after coming out of the application unit 23 and the removal unit 24 are spaced from each other. In this state, the temporary curing light source 25A temporarily cures the connection material 5 by irradiating the connection material 5 with ultraviolet rays. After the temporary curing of the connection material 5, the taping device 22 gradually reduces an interval between the optical fibers 2, arranges the plurality of optical fibers 2 in parallel, and gathers the optical fibers 2 into a tape shape. Note that the connection material 5 is temporarily cured, and thus removed parts (non-connection parts 4) of the connection material 5 are not connected to each other even when they come into contact with each other. Further, since it is before the main curing, an interval between the optical fibers 2 in a part (connection part 3) connected with the connection material 5 can also be reduced (line concentration). When the connection material 5 is completely cured by being irradiated with ultraviolet rays from the main curing light source 25B after the line concentration of the optical fibers 2, the optical fiber ribbon 1 is completed.

The tape manufacturing device 20 described above includes the application unit 23 that includes the air bubble generation device 26, and includes containing the air bubble 6 in the connection material 5 before applying the connection material 5. However, the tape manufacturing device 20 described above is one example, and can be changed as appropriate.

For example, the air bubble 6 may be formed by using rotary force of the rotary blade 241 of the removal unit 24 without providing the air bubble generation device 26. Then, the air bubble 6 adhering to the recessed part 241A of the rotary blade 241 and the like is mixed into the connection material 5. In other words, in applying the connection material 5, the connection material 5 may be applied between the adjacent optical fibers 2 while the air bubble 6 is mixed into the connection material 5. Also, in this case, the connection part 3 containing the air bubbles 6 can be formed.

The liquid connection material 5 having foaming property may be applied to the optical fiber 2 without providing the air bubble generation device 26. In other words, after applying the connection material 5 and before curing the connection material 5 and forming the connection part 3, the connection material 5 may be foamed. Also, in this case, the connection part 3 containing the air bubbles 6 can be formed.

<Optical Cable 10>

Figure 6A:
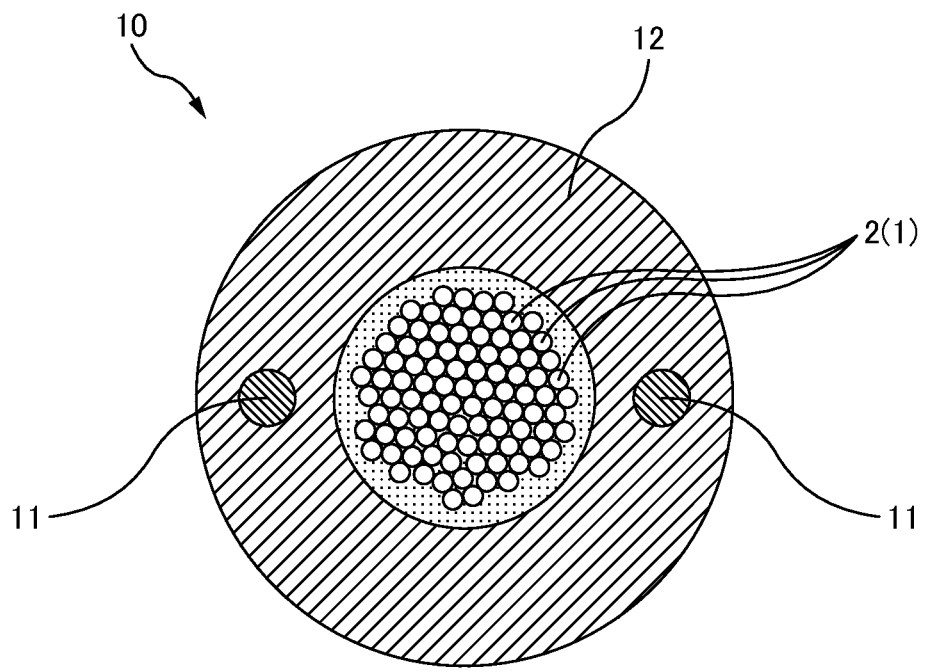
FIG. 6A is a cross-sectional view of a slotless-type optical cable 10.

FIG. 6A is a cross-sectional view of a slotless-type optical cable 10. The optical cable 10 includes the plurality of intermittent connection-type optical fiber ribbons 1, a plurality of tensile strength members 11, and a jacket 12. For example, the optical cable 10 including the 12 optical fiber ribbons 1 of 12 optical fibers includes the 144 optical fibers 2.

The tensile strength members 11 are linear members extending in the length direction. When tension is applied to the optical cable 10, the tensile strength members 11 receive the tension, and thus tension applied to the optical fiber 2 is suppressed. The jacket 12 is a member that coats the optical fiber ribbon 1 and the tensile strength members 11.

The plurality of optical fiber ribbons 1 are rolled up in the width direction and are gathered. The optical cable 10 is manufactured by pushing out a sheath material and forming the jacket 12 around the plurality of gathered optical fiber ribbons 1 and the plurality of tensile strength members 11.

Figure 6B:
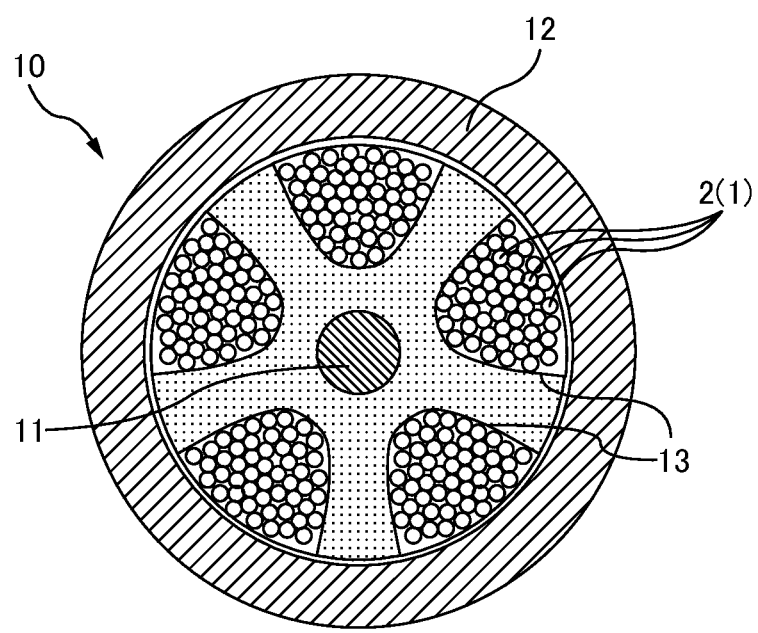
FIG. 6B is a cross-sectional view of a slot-type optical cable 10.

FIG. 6B is a cross-sectional view of a slot-type optical cable 10. Arrangement of the optical fiber ribbon(s) 1 and the tensile strength member(s) 11 is not limited to the arrangement illustrated in FIG. 6A, and can be changed as appropriate. The number of the optical fiber ribbon 1 included in the optical cable 10 may be one. For example, the slot-type optical cable 10 illustrated in FIG. 6B may be used. With the optical cable 10 illustrated in FIG. 6B, the tensile strength member 11 is provided at the center thereof, and a plurality of slots 13 are provided at predetermined intervals of an internal circumferential surface of the jacket 12. One or the plurality of optical fiber ribbons 1 are housed in each of the plurality of slots 13.

EXAMPLE 1

The optical fiber ribbon 1 according to one or more embodiments including the connection part 3 that contains the air bubbles 6 was manufactured by using the 12 optical fibers 2 having a diameter of 250 μm. Specifically, the liquid connection material 5 was mixed, and the connection material 5 in a state of containing the air bubbles 6 was applied to the optical fiber 2 and was cured. As a comparative example, an optical fiber ribbon including a connection part that does not contain an air bubble was manufactured.

A mid-span post branching test was conducted on the manufactured optical fiber ribbons in Example 1 and the comparative example. In the mid-span post branching test, first, the connection part was broken by inserting, between the adjacent optical fibers, a branching tool constituted by a nylon cylinder having a diameter of about 200 μm, and moving the branching tool in the length direction. Then, a transmission loss of each of the optical fibers was measured. Specifically, a light source was connected to one end of each of the optical fibers, and an oscilloscope was connected to the other end of each of the optical fibers. Then, light having a wavelength of 1.55 µm was inserted into the optical fiber from the light source, and a maximum transmission loss was measured by the oscilloscope. A test result is indicated in Table 1.

The optical cable (144-core optical cable) as illustrated in FIG. 6A was manufactured by bending the 12 optical fiber ribbons in the width direction in each of Example 1 and the comparative example. An ironing test was conducted on the manufactured optical cables in Example 1 and the comparative example.

The ironing test with tension of 130 kg, a mandrel diameter of 250 mm, a bending angle of 90 degrees, an ironing length of 2 m, and the number of ironing times of four times was conducted on each optical cable. The ironing test was conducted in conformity to Method E18B of IEC60794-1-21. The presence or absence of breakage of the connection part of the optical fiber ribbon was confirmed by taking the optical cable apart after the test. The absence of breakage of the connection part was evaluated as "Good", and the presence of one or more breakages of the connection part was evaluated as "Poor". A test result is indicated in Table 1.

Specifically, diameters of the air bubbles 6 in number of equal to or greater than 80% of a total number of the air bubbles 6 contained in the connection part 3 were made to fall within a range of ±5 µm of a target diameter. The optical fiber ribbons 1 of seven kinds were manufactured by changing a target diameter of air bubbles to be 10 µm, 20 µm, 40 µm, 55 µm, 70 µm, 90 µm, and 120 µm. As a comparative example, an optical fiber ribbon including a connection part that does not contain an air bubble was manufactured.

Each of the manufactured optical fiber ribbons in Example 2 and the comparative example in a length of 10 km was wrapped around a bobbin having a body diameter of 310 mm with tension of about 3.9 N. In this state, a maximum transmission loss for light having a wavelength of 1.55 µm was measured.

Then, a value $\Delta\alpha$ (dB/km) acquired by subtracting a maximum transmission loss (dB/km) per km of the optical fiber ribbon in the comparative example from a maximum transmission loss (dB/km) per km of each of the optical fiber ribbons in Example 2 was calculated. When the transmission loss difference $\Delta\alpha$ was equal to or less than 0.05 ($\Delta\alpha \leq 0.05$), it was evaluated as "Good". When the transmission loss difference $\Delta\alpha$ was greater than 0.05 ($\Delta\alpha > 0.05$), it was evaluated as "Poor". A test result is indicated in Table 2.

TABLE 2

| | DIAMETER OF AIR BUBBLES(µm) | | | | | | |
|---|---|---|---|---|---|---|---|
| | 10 | 20 | 40 | 55 | 70 | 90 | 120 |
| $\Delta\alpha$ (dB/km) | 0.02 | 0.01 | 0.03 | 0.02 | 0.02 | 0.08 | 0.11 |
| EVALUATION | GOOD | GOOD | GOOD | GOOD | GOOD | POOR | POOR |

TABLE 1

| | MID-SPAN POST BRANCHING TEST | IRONING TEST |
|---|---|---|
| EXAMPLE 1 | 0.1 dB OR LESS | GOOD |
| COMPARATIVE EXAMPLE | 0.1 dB OR LESS | POOR |

As a result of the mid-span post branching test, an excellent result that a maximum transmission loss was equal to or less than 0.1 dB was obtained from the optical fiber ribbons in both of Example 1 and the comparative example. As a result of the ironing test, breakage of the connection part was confirmed in the optical cable in the comparative example, but no breakage of the connection part was confirmed in the optical cable of Example 1. In other words, it was found that containing the air bubble(s) in the connection part can suppress breakage of the connection part when the optical fiber ribbon is bent in the width direction and the length direction while suppressing a transmission loss during mid-span post branching.

EXAMPLE 2

In Example 2, the optical fiber ribbon 1 according to one or more embodiments including the connection part 3 that contains the air bubble(s) 6 was manufactured, similarly to Example 1. However, in Example 2, a diameter of the air bubble 6 was controlled, and diameters of the air bubbles 6 contained in the connection part 3 were made approximately constant.

It was found from the test result that there is a possibility that a transmission loss may be increased when a diameter of the air bubbles 6 contained in the connection part 3 is increased. This is conceivably caused by an increase in irregularities of a surface of the connection part 3 when a diameter of the air bubbles 6 is increased. Then, lateral pressure is more easily applied to the optical fiber 2, and there is a possibility that a transmission loss (microbend loss) may be increased. When a diameter of the air bubbles is equal to or less than 70 µm, a transmission loss is small, which is good.

Thus, diameters of the air bubbles 6 in number of equal to or greater than 80% of a total number of the air bubbles 6 contained in the connection part 3 may be equal to or less than 70 µm. In this way, a decrease in transmission loss can be suppressed while suppressing breakage of the connection part 3 with the air bubbles 6.

Figure 7:
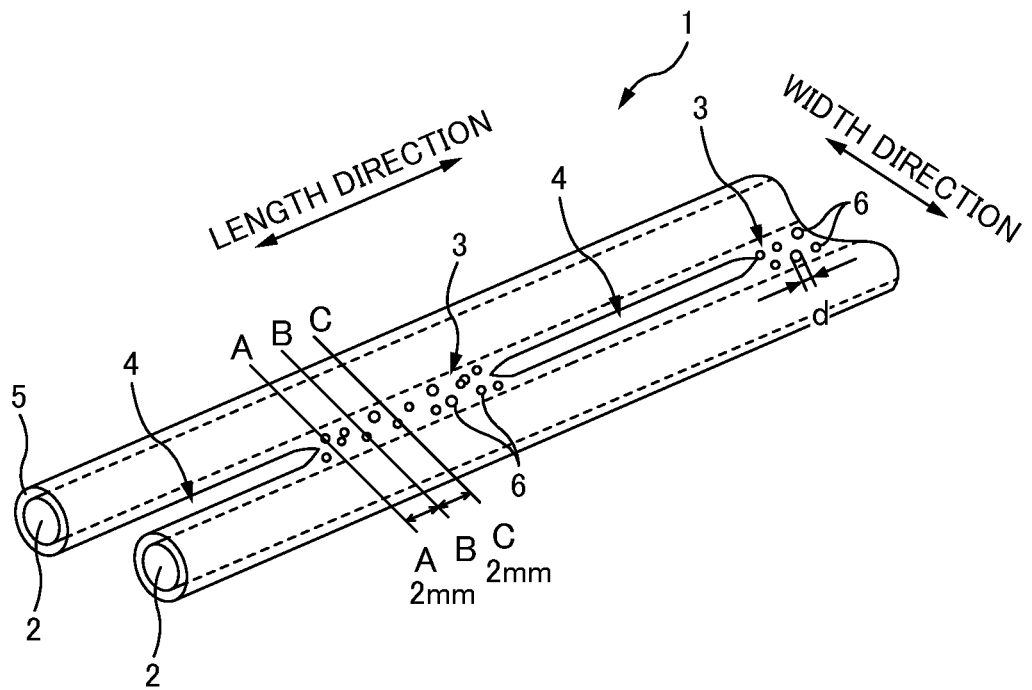
FIG. 7 is a schematic diagram when the optical fiber ribbon 1 is viewed from a side surface.

FIG. 7 is a schematic perspective view of the optical fiber ribbon 1. The number of the optical fibers 2 is reduced in order to simplify the drawing. As a method for measuring the number and a diameter d of the air bubbles 6 contained in the connection part 3, a method for observing the connection part 3 with a microscope in a plan view of (viewed from above) the optical fiber ribbon 1 can be exemplified. When the connection part 3 is transparent, the number and the diameter d of almost all of the air bubbles 6 contained in the connection part 3 can be measured. In Example 3, a measurement was performed on a total length of 50 cm in the length direction of the connection part 3. For example, when a length of the connection part 3 was 1 cm, a measurement was performed on 50 connection parts 3.

However, a measurement is not limited to the measurement described above. For example, the number and the diameter d of the air bubbles 6 may be measured by observing a section acquired by cutting the connection part 3 in the length direction with a microscope.

The number of the air bubbles 6 having the diameter d of equal to or less than 70 μm is the number of the air bubbles 6 having the diameter d of equal to or less than ±5 μm of 70 μm (65 to 75 μm) in a strict sense. Also, in Example 2, it was confirmed that the diameter d of the air bubbles 6 in number of equal to or greater than 80% of a total number of the air bubbles 6 contained in the connection part 3 fell within the range of ±5 μm of the target diameter (10 μm, 20 μm, 40 μm, 55 μm, 70 μm, 90 μm, 120 μm) of the air bubbles 6.

EXAMPLE 3

In Example 3, the optical fiber ribbon 1 according to one or more embodiments including the connection part 3 that contains the air bubble 6 was manufactured, similarly to Example 1. However, in Example 3, the optical fiber ribbon 1 was manufactured by controlling a generation amount of the air bubbles 6 in the connection material 5, and changing a percentage content of air bubbles in the connection part 3.

Figure 8:
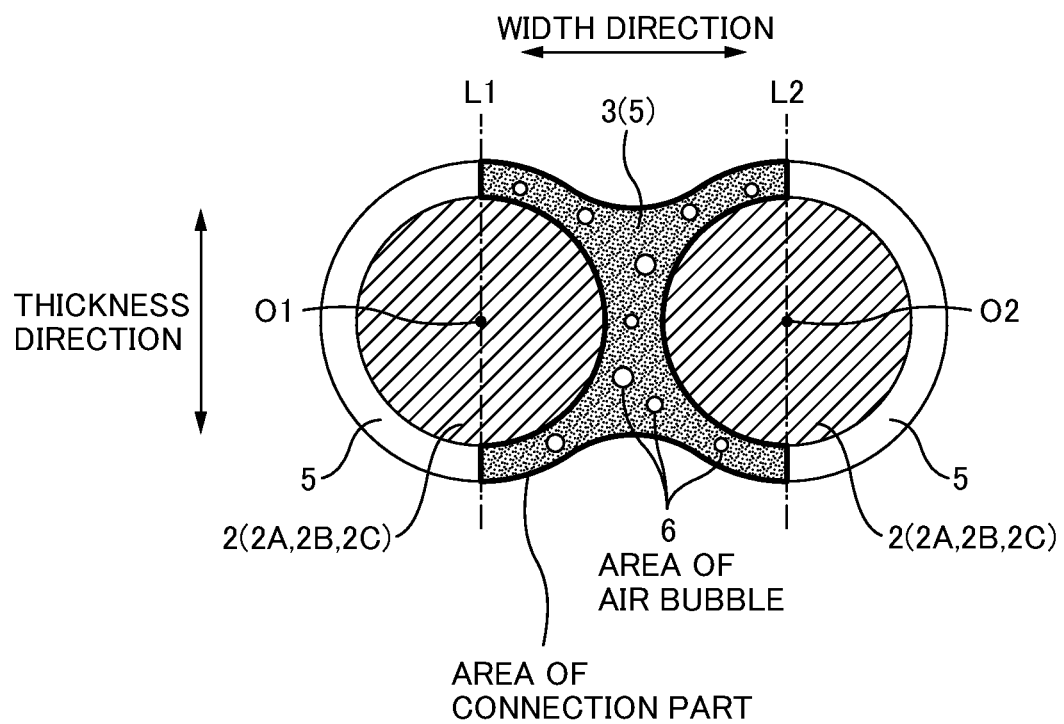
FIG. 8 is an explanatory diagram illustrating a percentage content of air bubbles.

FIG. 8 is an explanatory diagram illustrating a percentage content of air bubbles, and is a cross-sectional view of adjacent optical fibers 2. The percentage content of air bubbles is a proportion of a total area of the air bubbles 6 contained in the connection part 3 to an area of the connection part 3 in a section acquired by cutting the optical fiber ribbon 1 in the width direction. The percentage content of air bubbles is calculated by the following equation.

$$\text{Percentage content of air bubbles (\%)} = \text{total area of air bubbles } (\mu m^2)/\text{area of connection part } (\mu m^2) \times 100$$

As illustrated in FIG. 8, the connection material 5 constituting the connection part 3 may be applied to the entirety of the optical fiber 2. Thus, in the adjacent optical fibers 2, the connection material 5 between two virtual lines L1 and L2 passing through centers O1 and O2 of the respective optical fibers 2 and extending along a thickness direction orthogonal to the width direction is defined as the connection part 3. In other words, an area of the connection part 3 is an area of a region (region surrounded by a thick line in the drawing) surrounded by the virtual lines L1 and L2, an outer surface of the optical fibers 2, and an outer edge of the connection material 5.

In Example 3, the section (FIG. 8) of the connection part 3 between any two optical fibers 2 in the optical fiber ribbon 1 was observed with a microscope. Then, a total area of the air bubbles 6 and an area of the connection part 3 were acquired by using an area calculation program, and a percentage content of air bubbles was calculated. As in an A-A section, a B-B section, and a C-C section illustrated in FIG. 7, a percentage content of air bubbles in 10 sections was calculated for every 2 mm in the length direction. Then, an average value of the percentage contents of air bubbles in the 10 sections was obtained as a percentage content of air bubbles of the optical fiber ribbon 1.

In Example 3, optical fiber ribbons 1 of four kinds having percentage contents of air bubbles of 0.2%, 4.5%, 15.5%, and 18.5% were manufactured. As a comparative example, an optical fiber ribbon including a connection part that does not contain an air bubble was manufactured. Furthermore, the optical cable (optical cable with 144 optical fibers) as illustrated in FIG. 6A was manufactured by bending the 12 optical fiber ribbons in the width direction in each of Example 3 and the comparative example.

An ironing test was conducted on the manufactured optical cables in Example 3 and the comparative example. The ironing test with tension of 130 kg, a mandrel diameter of 250 mm, a bending angle of 90 degrees, and an ironing length of 2 m was conducted, similarly to Example 1. However, the test was conducted on each of the optical cables for a plurality of times by changing the number of ironing times to twice, four times, six times, eight times, 10 times, and 12 times. The presence or absence of breakage of the connection part of the optical fiber ribbon was confirmed by taking the optical cable apart for each number of ironing times. Then, a minimum number of ironing times when breakage of the connection part was confirmed was acquired for each of the optical cables.

Figure 9:
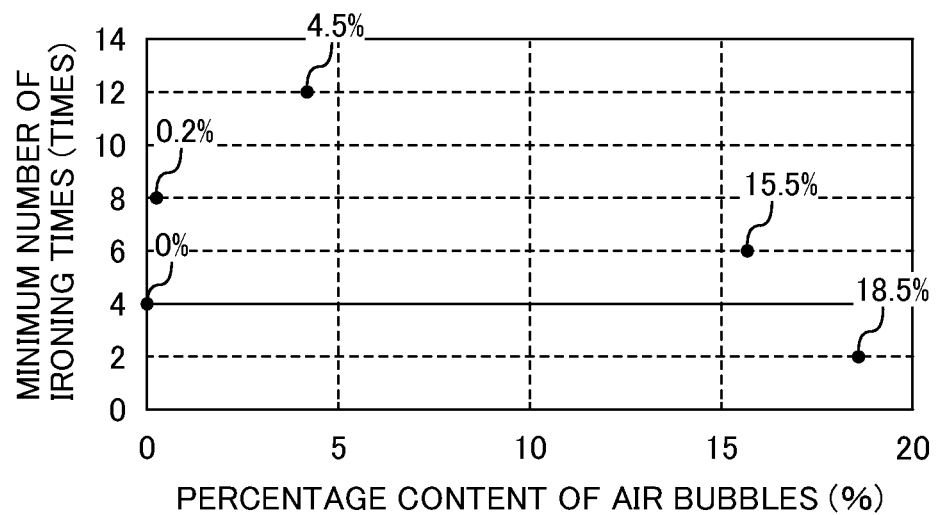
FIG. 9 is a graph illustrating a test result.

FIG. 9 is a graph illustrating a test result. A horizontal axis indicates a percentage content of air bubbles (%), and a vertical axis indicates a minimum number of ironing times (times). A minimum number of ironing times in the comparative example (percentage content of air bubbles: 0%) was four times. When the percentage content of air bubbles was 0.2%, 4.5%, and 15.5%, a minimum number of ironing times was greater than that in the comparative example (four times). In other words, it was found that breakage of the connection part 3 can be suppressed when a small amount of air bubbles 6 having a percentage content of air bubbles of 0.2%, for example, are contained in the connection part 3. On the other hand, a minimum number of ironing times when a percentage content of air bubbles was 18.5% was equal to or less than that in the comparative example (four times). In other words, it was found that an effect of suppressing breakage of the connection part 3 decreases when a percentage content of air bubbles is increased too much.

Figure 10A:
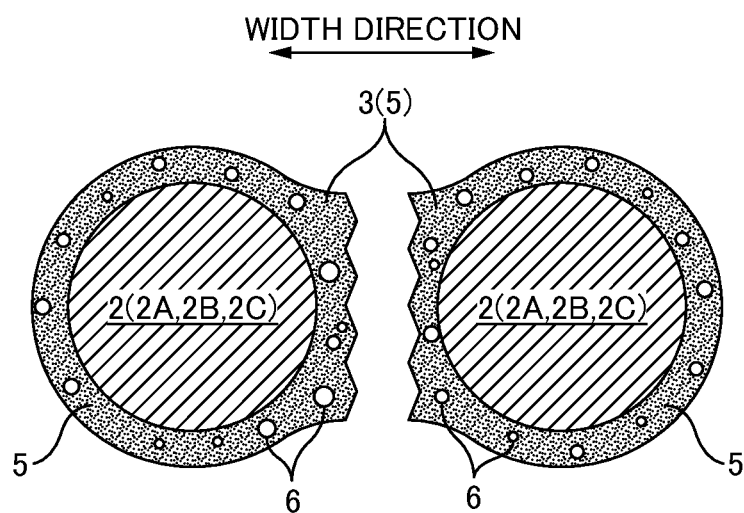
FIGS. 10A and 10B are explanatory diagrams illustrating breakage modes of a connection part 3.
Figure 10B:
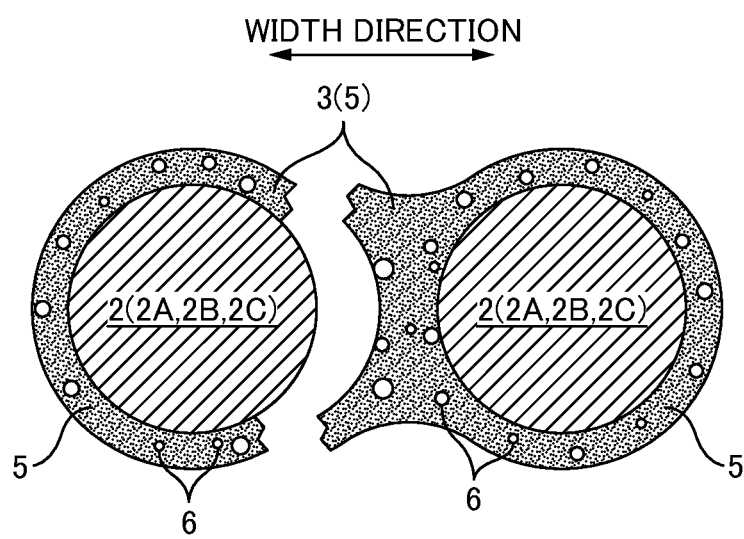

FIGS. 10A and 10B are explanatory diagrams illustrating breakage modes of the connection part 3. FIG. 10A is an explanatory diagram illustrating a breakage mode in which the connection part 3 is broken due to a crack generated in the connection part 3. FIG. 10B is an explanatory diagram illustrating a breakage mode due to peeling at an interface between the optical fiber 2 (herein, the colored layer 2C of the optical fiber 2) and the connection part 3. When the connection part 3 is broken, the breakage mode illustrated in FIG. 10B is normally more dominant than the breakage mode illustrated in FIG. 10A. When the air bubble 6 is contained in the connection part 3, and the air bubble 6 of the connection part 3 contacts the outer surface of the optical fiber 2, a contact area of the outer surface of the optical fiber 2 and the connection part 3 (connection material 5) decreases. In this way, adhesion of the connection part 3 to the optical fiber 2 is weakened. Thus, the breakage mode illustrated in FIG. 10B is more likely to occur.

When a percentage content of air bubbles in the connection part 3 is increased too much, a probability that the air bubble 6 of the connection part 3 contacts the outer surface of the optical fiber 2 increases. Thus, as the result illustrated in FIG. 9, the effect of suppressing breakage of the connection part 3 conceivably decreases.

Thus, a percentage content of air bubbles of the connection part 3 may not be increased too much. Specifically, the percentage content of air bubbles may be equal to or greater than 0.2% and equal to or less than 15%. In this way, the air bubble (s) 6 is less likely to be located at the interface between the outer surface of the optical fiber 2 and the connection part 3, and a contact area of the outer surface of the optical fiber 2 and the connection part 3 can be secured.

Thus, adhesion of the connection part 3 to the optical fiber 2 is increased. In this way, the connection part 3 is less likely to be peeled from the optical fiber 2, and breakage of the connection part 3 can be suppressed.

Figure 11:
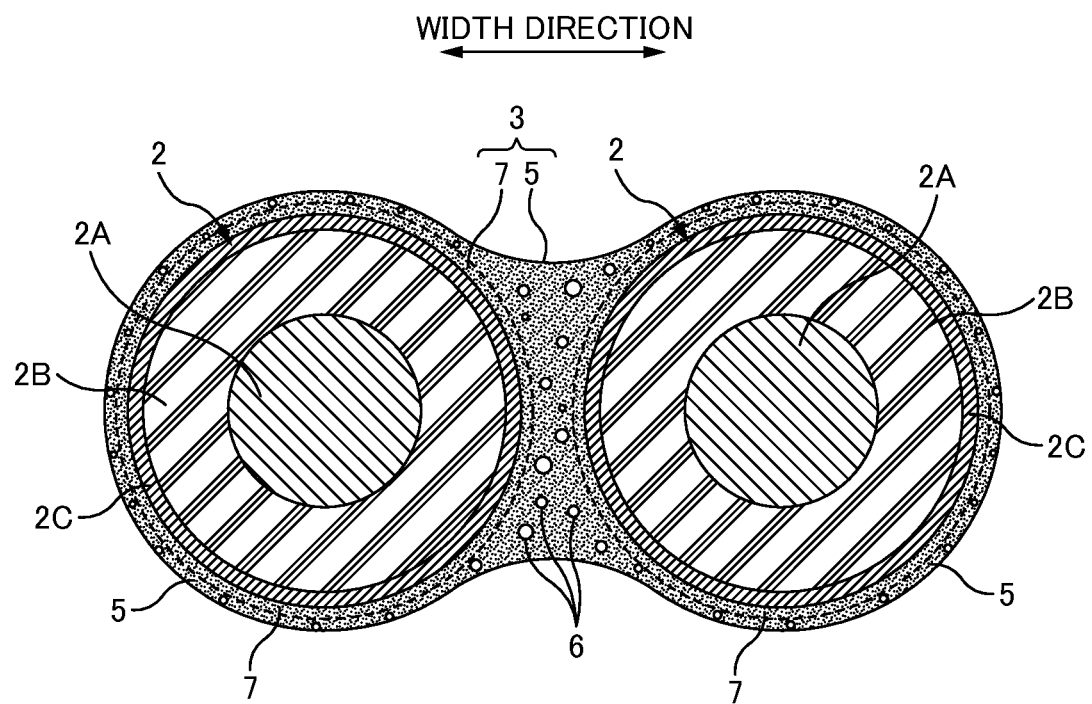
FIG. 11 is an explanatory diagram illustrating an optical fiber ribbon 1 according to one or more embodiments.

FIG. 11 is an explanatory diagram illustrating an optical fiber ribbon 1 according to one or more embodiments. FIG. 11 is a cross-sectional view of adjacent optical fibers 2 in the optical fiber ribbon 1. As described above, the breakage mode illustrated in FIG. 10B is more likely to occur than the breakage mode illustrated in FIG. 10A. Thus, in one or more embodiments described below, an air bubble in a connection part 3 is not formed in an outer surface of the optical fiber 2 (interface between the optical fiber 2 and the connection part 3).

Therefore, in the optical fiber ribbon 1 according to one or more embodiments, a connection material 7 that does not contain an air bubble 6 is applied to the outer surface of the optical fiber 2 (outer surface of a colored layer 2C in a case of FIG. 11), and then a connection material 5 that contains the air bubble 6 is applied. In other words, the connection part 3 is formed from the connection material 7 that does not contain the air bubble 6 and the connection material 5 that contains the air bubble 6.

Thus, a contact area of the outer surface of the optical fiber 2 and the connection part 3 (connection material 7) can be secured, and adhesion of the connection part 3 to the optical fiber 2 is increased. Thus, the connection part 3 is less likely to be peeled from the optical fiber 2, and breakage of the connection part 3 can be suppressed. Note that the connection material 5 that contains the air bubble 6 and the connection material 7 that does not contain the air bubble 6 may be resins (such as ultraviolet curing resin and thermosetting resin) having the same configuration, but may be resins having different configurations.

<Method for Manufacturing Optical Fiber Ribbon 1>

Figure 12:
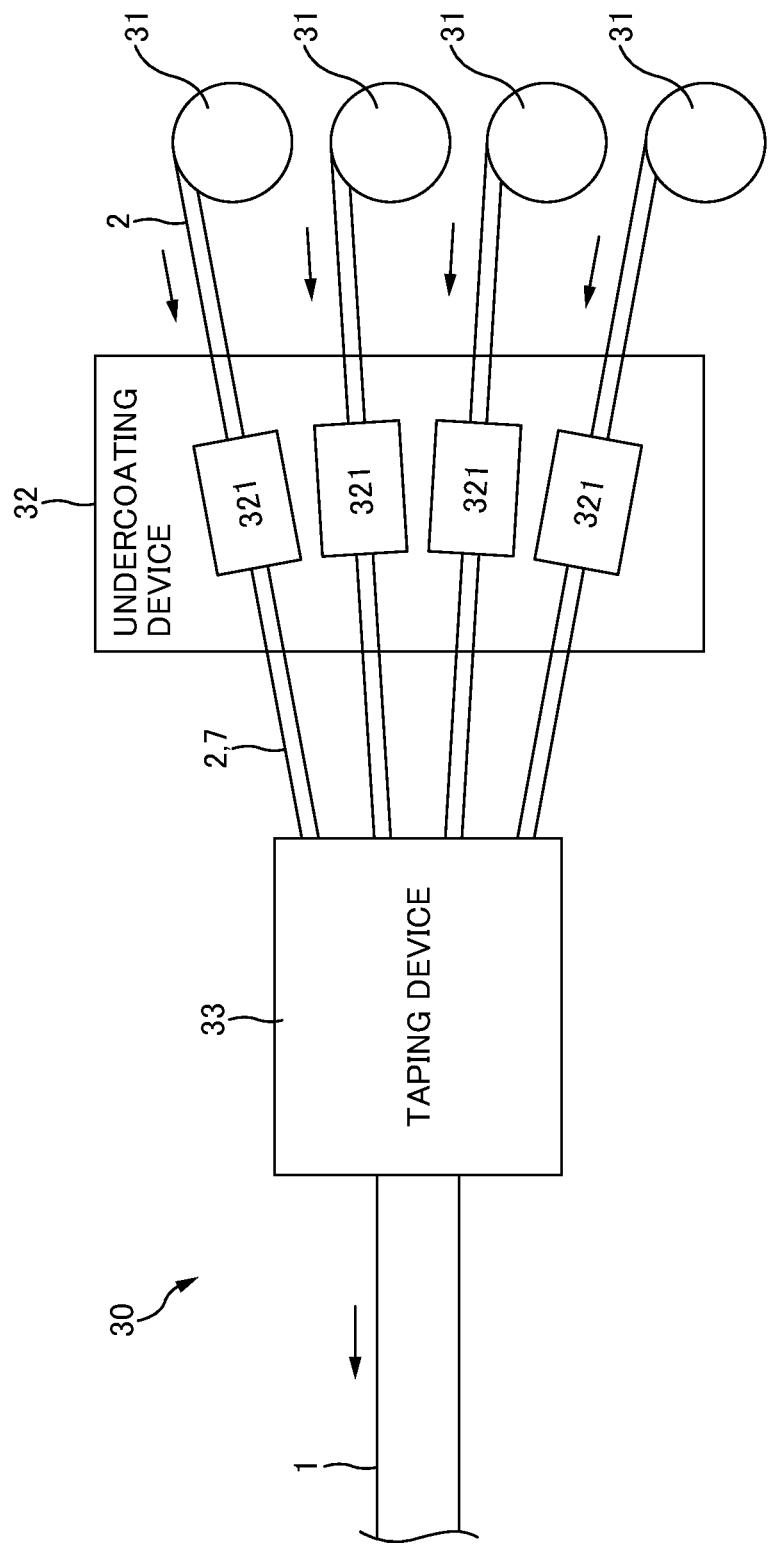
FIG. 12 is an explanatory diagram illustrating a tape manufacturing device 30 that manufactures the optical fiber ribbon 1 according to one or more embodiments.

FIG. 12 is an explanatory diagram illustrating a tape manufacturing device 30 that manufactures the optical fiber ribbon 1 according to one or more embodiments. The number of the optical fibers 2 is four in order to simplify the drawing. The tape manufacturing device 30 in one or more embodiments includes a fiber supply unit 31, an undercoating device 32, and a taping device 33. The fiber supply unit 31 and the taping device 33 have the same configurations as those of the devices of one or more embodiments.

The undercoating device 32 is a device that applies the connection material 7 that does not contain the air bubble to the outer surface of the optical fiber 2. The undercoating device 32 includes, for each optical fiber 2, a coating die 321 filled with the liquid connection material 7 that does not contain the air bubble 6. The plurality of optical fibers 2 are inserted through the corresponding coating dies 321. In other words, the connection material 7 is applied while the adjacent optical fibers 2 have an interval therebetween. Thus, the adjacent optical fibers 2 are not connected to each other with the connection material 7 that does not contain the air bubble 6, and are supplied to the taping device 33 while being spaced from each other.

As described above, the plurality of optical fibers 2 are inserted through one coating die (cf. 231 in FIG. 5A) filled with the liquid connection material 5 that contains the air bubble 6 in the taping device 33. Thus, the adjacent optical fibers 2 coming out of the coating die are connected to each other with the connection material 5 that contains the air bubble 6. Then, a part of the connection material 5 between the adjacent optical fibers 2 is removed with a rotary blade (cf. 241 in FIG. 5A), and the connection part 3 and a non-connection part 4 are formed. Subsequently, the connection material 7 that does not contain the air bubble 6 and the connection material 5 that contains the air bubble 6 are cured by a light source (cf. 25A and 25B in FIG. 5A).

As described above, while the plurality of optical fibers 2 to which the connection material 7 that does not contain the air bubble 6 is applied are spaced from each other, the connection material 5 that contains the air bubble 6 is applied. In this way, the connection material 5 that contains the air bubble 6 can connect the adjacent optical fibers 2 to each other.

While the connection material 7 that does not contain the air bubble 6 is liquid, the connection material 5 that contains the air bubble 6 is applied. In this way, even when the air bubble 6 is located at the interface between the connection material 7 that does not contain the air bubble 6 and the connection material 5 that contains the air bubble 6, adhesion between both of the connection materials 5 and 7 can be secured. Thus, peeling of the connection part 3 (connection materials 5 and 7) from the optical fiber 2 can be suppressed, and breakage of the connection part 3 can be suppressed.

Note that the tape manufacturing device 30 is not limited to that illustrated in FIG. 12. For example, the plurality of optical fibers 2 may be inserted through one coating die filled with the connection material 7 that does not contain the air bubble 6. In this case, the connection material 7 between the plurality of optical fibers 2 coming out of the coating die may be continuously removed by a rotary blade that does not include a recessed part.

In FIG. 11, the connection material 7 that does not contain the air bubble 6 is applied to the entirety of the outer surface of the optical fiber 2, but it is not limited thereto. The connection material 7 that does not contain the air bubble 6 may be at least applied to the outer surface of the optical fiber 2 facing between the adjacent optical fibers 2.

EXAMPLE 4

In Example 4, two examples of the optical fiber ribbon 1 of 12 optical fibers of one or more embodiments were manufactured. The configurations are the same except for the presence or absence of application of the connection material 7 that does not contain the air bubble(s) 6.

A mid-span post branching test was conducted on the manufactured optical fiber ribbons 1, similarly to Example 1. As a result, an excellent result that a maximum transmission loss was equal to or less than 0.1 dB was obtained from the optical fiber ribbons 1 of one or more embodiments.

The optical cable 1 as illustrated in FIG. 6A was manufactured by bending the 12 optical fiber ribbons 1 in the width direction in one or more embodiments. Similarly to Example 3, the ironing test was conducted on the manufactured optical cables 1 by changing the number of ironing times for a plurality of times (with the number of ironing times of six times, eight times, 10 times, 12 times, 14 times, and 16 times). A minimum number of ironing times when breakage of the connection part 3 was confirmed was acquired for each of the optical cables 1. A minimum number of ironing times of the optical cable 1 in one or more embodiments was eight times. Breakage of the connection part 3 was not confirmed in the optical cable 1 in one or more embodiments even when the number of ironing times was 16 times.

It was clear from the result above that avoiding contact of the air bubble 6 with the outer surface of the optical fiber 2 can further suppress breakage of the connection part 3 when the optical fiber ribbon 1 is bent in the width direction and the length direction while suppressing a transmission loss during mid-span post branching.

Figure 13A:
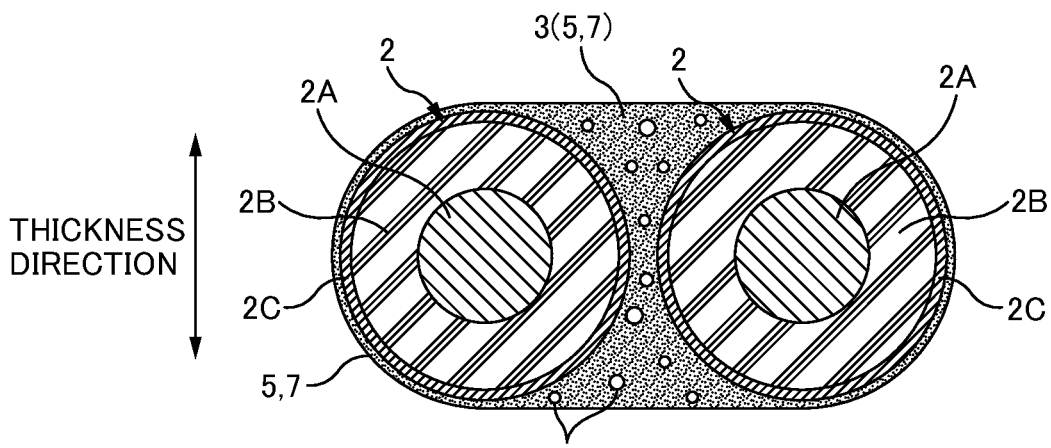
FIGS. 13A to 13C are explanatory diagrams illustrating an optical fiber ribbon 1 according to one or more embodiments.
Figure 13B:
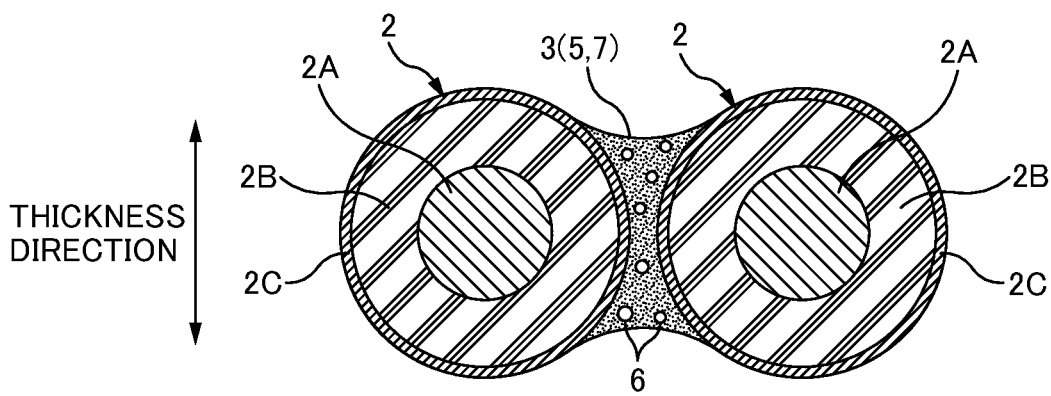
Figure 13C:
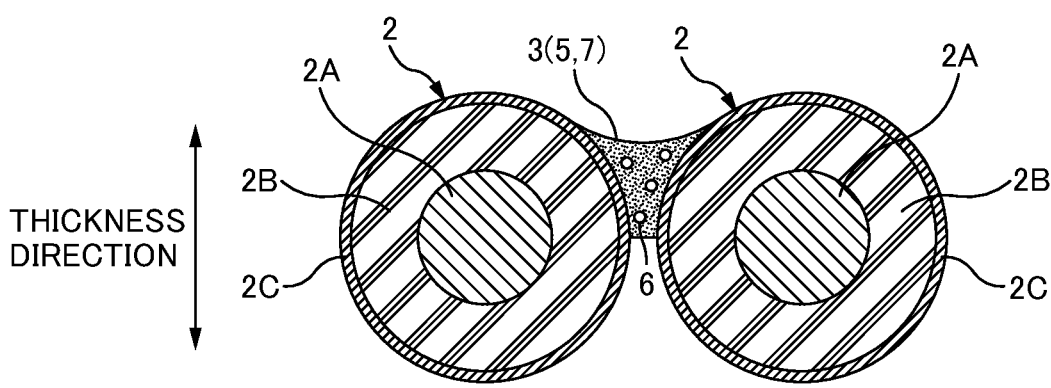
Figure 14:
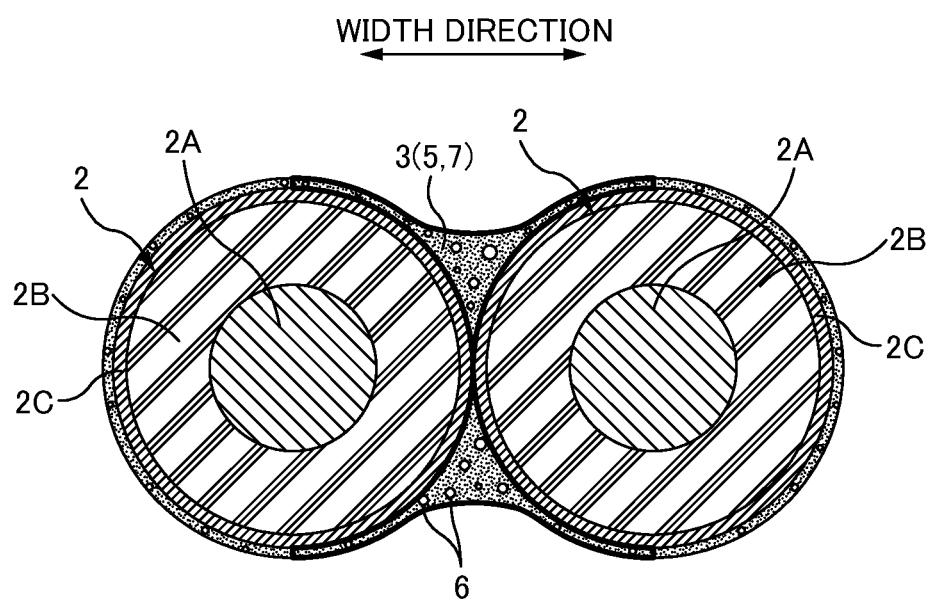
FIG. 14 is an explanatory diagram illustrating an optical fiber ribbon 1 according to one or more embodiments.
Figure 15:
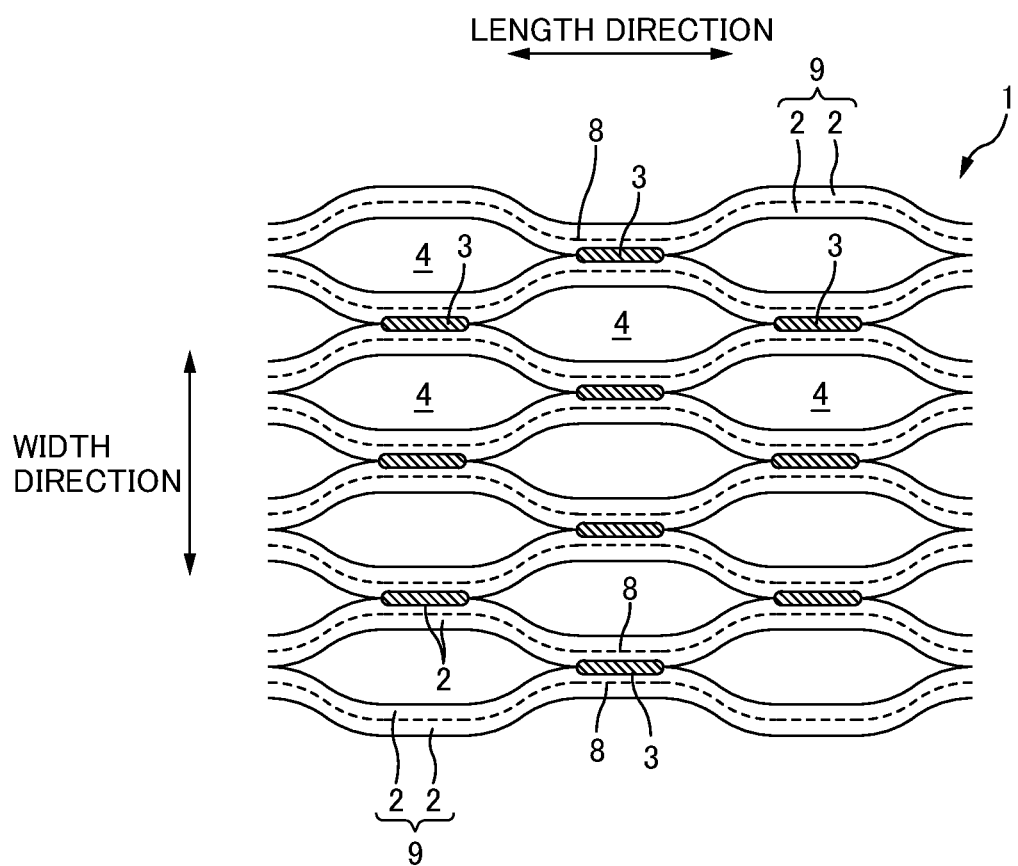
FIG. 15 is an explanatory diagram illustrating an optical fiber ribbon 1 according to one or more embodiments.

FIGS. 13A to 13C, 14, and 15 are explanatory diagrams illustrating an optical fiber ribbon 1 according to one or more embodiments. FIGS. 13A to 13C and 14 are cross-sectional views of adjacent optical fibers 2 in the optical fiber ribbon 1. FIG. 15 is a plan view of the optical fiber ribbon 1.

As illustrated in FIG. 2 described above, a thickness of a central part of a connection part 3 in a width direction is not limited to be thin. As illustrated in FIG. 13A, a thickness of the connection part 3 may be constant. As illustrated in FIG. 13B, connection materials 5 and 7 may be applied only between the optical fibers 2 to form the connection part 3. As illustrated in FIG. 13C, the connection materials 5 and 7 may be applied to only a part between the optical fibers 2 to form the connection part 3 toward one side in the thickness direction.

In a case of FIGS. 13B and 13C, the connection materials 5 and 7 do not need to be applied to the entirety of an outer surface of the optical fiber 2. Thus, when the connection materials 5 and 7 are ejected toward the optical fiber 2 and the like, for example, a degree of flexibility in a method for applying the connection materials 5 and 7 is increased.

The adjacent optical fibers 2 are optical fibers 2 adjacent to each other in the width direction. Thus, the adjacent optical fibers 2 may have an interval therebetween as illustrated in FIG. 2, and the adjacent optical fibers 2 may not have an interval therebetween as illustrated in Fig. 14. Also, in a case of FIG. 14, the connection part 3 is formed by applying the connection materials 5 and 7 between the adjacent optical fibers 2 (region surrounded by a thick line in the diagram), and the adjacent optical fibers 2 are connected to each other.

As illustrated in FIG. 15, a part of the optical fibers 2 aligned in the width direction may be connected to the adjacent optical fiber 2 with another connection part 8 continuously located in the length direction, and an optical fiber group 9 may be formed. Then, the adjacent optical fiber groups 9 may be connected to each other with the connection parts 3 intermittently disposed in the length direction. In FIG. 15, the two adjacent optical fibers 2 are connected to each other with the other continuous connection part 8, and every two optical fibers 2 are connected to each other with the intermittent connection part 3. Also, in this optical fiber ribbon 1, separation parts 4 are intermittently formed in the length direction, and the connection part 3 is intermittently formed between the separation part 4 and the separation part 4 aligned in the length direction. Also, in this case, the optical fiber ribbon 1 can be bent in the width direction. Further, fusion splicing can be increased. Note that, in FIG. 15, the optical fibers 2 are spaced from each other in the width direction with the separation part 4, but the optical fibers 2 may separatably contact each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: (Intermittent connection-type) optical fiber ribbon;
2: Optical fiber;
2A: Optical fiber part;
2B: Sheath layer;
2C: Colored layer;
3: Connection part;
4: Non-connection part (separation part);
5: Connection material;
6: Air bubble;
7: Connection material;
8: Another connection part;
9: Optical fiber group;
10: Optical cable;
11: Tensile strength member;
12: Jacket;
20: Tape manufacturing device;
21: Fiber supply unit;
22: Taping device;
23: Application unit;
24: Removal unit;
25: Light source;
26: Air bubble generation device;
30: Tape manufacturing device;
31: Fiber supply unit;
32: Undercoating device;
33: Taping device.

The invention claimed is:

1. An intermittent connection-type optical fiber ribbon comprising:
   optical fibers aligned in a width direction of the intermittent connection-type optical fiber ribbon; and
   a connection part disposed between two separation spaces that are aligned in a lengthwise direction of the intermittent connection-type optical fiber ribbon and that separate adjacent ones of the optical fibers, wherein
   the connection part contains air bubbles,
   a percentage content of the air bubbles is 15.5% or less,
   the percentage content of the air bubbles is a proportion of a total area of the air bubbles contained in the connection part to an area of the connection part in a section acquired by cutting the intermittent connection-type optical fiber in the width direction
   the intermittent connection-type optical fiber ribbon further comprises:
   a plurality of connection parts intermittently disposed in the length direction, and
   each of the optical fibers is connected to an adjacent one of the optical fibers with the connection parts.

2. The intermittent connection-type optical fiber ribbon according to claim 1, wherein the separation spaces and the connection part are also disposed in the width direction.

3. The intermittent connection-type optical fiber ribbon according to claim 1, wherein
   two adjacent ones of the optical fibers are continuously connected in the lengthwise direction using one of the connection parts to form optical fiber groups, and
   adjacent ones of the optical fiber groups are connected to one another using the connection parts.

4. The intermittent connection-type optical fiber ribbon according to claim 1, wherein 80% or more of the air bubbles in the connection part have a diameter of 70 μm or less.

5. The intermittent connection-type optical fiber ribbon according to claim 1, wherein the percentage content of the air bubbles is between 0.2% and 15%.

6. The intermittent connection-type optical fiber ribbon according to claim 1, wherein the air bubbles contained in the connection part do not contact an outer surface of the optical fibers.

7. The intermittent connection-type optical fiber ribbon according to claim 1, wherein a connection material that forms the connection part is not applied to an entirety of an outer surface of the optical fibers and is applied to only a part between the optical fibers.

8. A method for manufacturing an intermittent connection-type optical fiber ribbon comprising:
applying a connection material between adjacent optical fibers that are aligned in a width direction of the intermittent connection-type optical fiber ribbon;
forming, using the connection material, a connection part between two separation spaces that are aligned in a lengthwise direction of the intermittent connection-type optical fiber ribbon and that separate adjacent ones of the optical fibers; and
forming air bubbles in the connection part during the applying of the connection material, wherein
a percentage content of air bubbles is 15.5% or less,
the percentage a proportion of a total area of the air bubbles contained in the connection part to an area of the connection part in a section acquired by cutting the intermittent connection-type optical fiber in the width direction, and
the method further comprises:
applying another connection material that does not contain any air bubbles to an outer surface of the optical fibers before the applying of the connection material.

9. The method according to claim 8, further comprising:
containing the air bubbles in the connection material before the applying of the connection material.

10. The method according to claim 8, further comprising:
mixing the air bubbles into the connection material before the applying of the connection material.

11. The method according to claim 8, further comprising:
foaming the connection material such that the connection contains the air bubbles after the applying of the connection material.

* * * * *